US011856478B2

(12) United States Patent
Limonad et al.

(10) Patent No.: US 11,856,478 B2
(45) Date of Patent: Dec. 26, 2023

(54) DOUBLE-SIDED TWO-WAY RANGING PROTOCOL BASED ON COMPOSITE, ULTRASONIC TONES

(71) Applicant: INTERNATIONAL BUSINESS MACHINES CORPORATION, Armonk, NY (US)

(72) Inventors: Lior Limonad, Afek (IL); Dean Haber, Haifa (IL); Ashafaaq Minhas, Jersey City, NJ (US); John Maxwell Cohn, Richmond, VT (US); Marc PH. Stoecklin, Richterswil (CH); Nirmit V Desai, Yorktown Heights, NY (US); Jonathan Muehlstein, Zikhron Ya'akov (IL)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 17/411,219

(22) Filed: Aug. 25, 2021

(65) Prior Publication Data

US 2023/0072792 A1 Mar. 9, 2023

(51) Int. Cl.
*H04W 64/00* (2009.01)
*H04W 4/02* (2018.01)
(Continued)

(52) U.S. Cl.
CPC .............. *H04W 4/023* (2013.01); *G01S 5/30* (2013.01); *H04W 4/80* (2018.02); *G06F 2218/10* (2023.01); *G06F 2218/12* (2023.01)

(58) Field of Classification Search
CPC combination set(s) only.
See application file for complete search history.

(56) References Cited

U.S. PATENT DOCUMENTS 10,547,736 B2  1/2020  Hannon
2006/0071847 A1  4/2006  Fiore
(Continued)

FOREIGN PATENT DOCUMENTS

JP   2003028956 A   1/2003
RU   2392641 C1   6/2010

OTHER PUBLICATIONS

International Searching Authority, "Notification of Transmittal of the International Search Report and the Written Opinion of the International Searching Authority, or the Declaration", File Reference PF220589PCT, International application No. PCT/CN2022/113866, International Filing Date Aug. 22, 2022, dated Dec. 7, 2022, 9 pages.

(Continued)

*Primary Examiner* — Moustapha Diaby
(74) *Attorney, Agent, or Firm* — Kristofer Haggerty

(57) ABSTRACT

A method of determining a range between two devices, which can for instance be wireless devices, such as handheld devices. The method performs a double-sided two-way ranging protocol at the two devices. This protocol causes the two devices to transmit and receive signals, with a view to determining the range between the two devices, using a two-way ranging methods, where each of the signals is a composite tone generated as a composition of two waveforms that are timewise separated by a gap to form a bipolar waveform. The gap is a zero or low-amplitude signal, contrasting with the two waveforms. The particular pattern in the correlation footprint eases the determination of the time of flight. The method can be used to measure social distancing.

20 Claims, 6 Drawing Sheets

(51) Int. Cl.
*G01S 5/30* (2006.01)
*H04W 4/80* (2018.01)

(56) References Cited

U.S. PATENT DOCUMENTS

2012/0071170 A1* 3/2012 Cho .................... H04W 64/00
455/456.1
2018/0059235 A1* 3/2018 McLaughlin ........... G01S 13/20

OTHER PUBLICATIONS

Alsharif et al., "Zadoff-Chu Coded Ultrasonic Signal for Accurate Range Estimation," 2017 25th European Signal Processing Conference (EUSIPCO), https://ieeexplore.ieee.org/document/8081408, pp. 1250-1254.
Author Unknown, "Qorvo—Our Technology," Decawave, Accessed Jan. 14, 2021, https://www.decawave.com/technology1/, 6 pages.
Fotouhi, "Accurate acoustic ranging system using android smartphones," Virginia Commonwealth University (VCU), Theses and Dissertations, 2017, https://scholarscompass.vcu.edu/etd/5053/%20?utm_source=scholarscompass.vcu.edu%2Fetd%2F5053&utm_%20medium=PDF&utm_campaign=PDFCoverPages, 56 pages.
Marioli et al., "Digital Time of Flight Measurement for Ultrasonic Sensors," IEEE Transactions on Instrumentation and Measurement, vol. 41, Issue: 1, Feb. 1992, pp. 93-97.
Peng et al., "BeepBeep: A high accuracy acoustic ranging system using COTS mobile devices," SenSys'07, Nov. 6-9, 2007, https://www.researchgate.net/publication/22109130, 15 pages.
Wikipedia, "Symmetrical double-sided two-way ranging," WIKIPEDIA The Free Encyclopedia, Accessed Jul. 28, 2021, https://en.wikipedia.org/wiki/Symmetrical_double-sided_two-way_ranging, 2 pages.

* cited by examiner

DOUBLE-SIDED TWO-WAY RANGING PROTOCOL BASED ON COMPOSITE, ULTRASONIC TONES

BACKGROUND

The invention relates in general to computerized methods, devices, and computer program products for determining ranges between pairs of devices using a double-sided two-way ranging protocol. In particular, it relates to methods performing a two-way ranging based on (near-)ultrasonic tones, which are generated as composition of core waveforms that are timewise separated by a gap.

Two-way ranging techniques are commonly used for measuring distances between two wireless devices. In radio technology, this technique exploits delays that naturally occur in signal transmission (also known as times of flight) to determine the range between two devices such as stations. For example, a first signal is transmitted from a first node A to a second node B. The difference in time (called the signal propagation delay) between the transmission from the first node and the reception at the second node can be calculated. Next, the first node A receives an acknowledgement (i.e., a second signal) from the second node B. This acknowledgement is sent after some processing time (called processing delay), i.e., the time necessary for the second node B to process the incoming first signal, generate the acknowledgement, and set it for transmission. So, a further signal propagation delay can be calculated by the first node A on receiving the acknowledgement signal from node B. The signal propagation delays are finally used to determine the range between the two nodes.

This method is double-sided in that only two nodes are involved in measuring the range between them. It is two-way in that a first signal (also called test signal, e.g., a test packet) is sent from one of the two devices, followed by a second signal (the acknowledgement) that is sent from the other one of the two devices.

The above steps are typically mirrored at the second node. In that case, the method is symmetrical in that the measurements from node A to node B are mirrored at the second node; this method is called symmetrical double-sided two-way ranging.

One may attempt to implement a two-way ranging method based on tones (i.e., sounds) exchanged between two devices. As with usual two-way ranging techniques, a problem is to be able to detect the exact point in time at which a tone is transmitted and received, both by the transmitter and the receiver. Ideally, a sub-millisecond accuracy is desired. Prior methods typically seek to attain this by recording the sound prior to and during the invocation of a protocol as described above and then locating a transmission fingerprints in the recording. Such methods seek for significant peaks (in time) in the cross-correlation measure obtained between the known transmitted waveform and the signal recorded. However, there are, in practice, many false peaks appearing in the cross-correlation measurement, due to factors such as noise and interferences, e.g., multiple echoes to the transmitted signal (also known as the 'multipath' issue). Being able to detect the right peak in the cross-correlation signal is essential for the precision of the measurements.

SUMMARY

According to a first aspect, the present invention is embodied as a method of determining a range between two devices, i.e., a first device and a second device, which can for instance be wireless devices, such as handheld devices. The method basically revolves around performing a double-sided two-way ranging protocol at the two devices. This protocol causes the two devices to transmit and receive signals, with a view to determining the range between the two devices, as in known two-way ranging methods. However, in the present case, each of the signals is a composite tone generated as a composition of two waveforms that are timewise separated by a gap, so as for the composition to form a bipolar waveform. The gap is typically a zero- or low-amplitude signal, substantially contrasting (in terms of amplitude) with the two waveforms. This gives rise to a particular pattern in the correlation footprint, which markedly eases the determination of the time of flight. Such a method can advantageously be used to measure social distancing (or social contacts).

According to another aspect, the invention is embodied as a device comprising processing means, as well as a tone generator, a transmitter, and a receiver, each connected to the processing means. The processing means are configured to orchestrate operations of the tone generator, the transmitter, and the receiver, for the device to perform a double-sided two-way ranging protocol with a remote device, consistently with the method described above.

In operation, the device transmits, at a first time, a first signal to the remote device. The device then receives, at a second time, a second signal transmitted by the second device. The processing means is configured to obtain a comparand based on the second signal received, it then correlates an expected signal with this comparand to determine a second time, based on which a time interval between the first time and the second time is computed. Note, this comparand may advantageously be obtained based on both the first signal (as transmitted) and the second signal (as received). Another correlation operation can then be performed to accurately determine the first time, i.e., the time at which the first signal was transmitted. The range between the two devices is finally determined in accordance with that time interval. Each of the first signal and the second signal is a composite tone generated as a composition of two waveforms that are timewise separated by a gap for the composition to form a bipolar waveform.

According to a final aspect, the invention is embodied as a computer program product. The computer program product comprises a computer readable storage medium having program instructions embodied therewith, where the program instructions are executable by processing means of a device to cause the latter to perform a double-sided two-way ranging protocol according to the above method.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Devices, computerized methods, and computer program products embodying the present invention will now be described, by way of non-limiting examples.

DETAILED DESCRIPTION

Figure 1A:
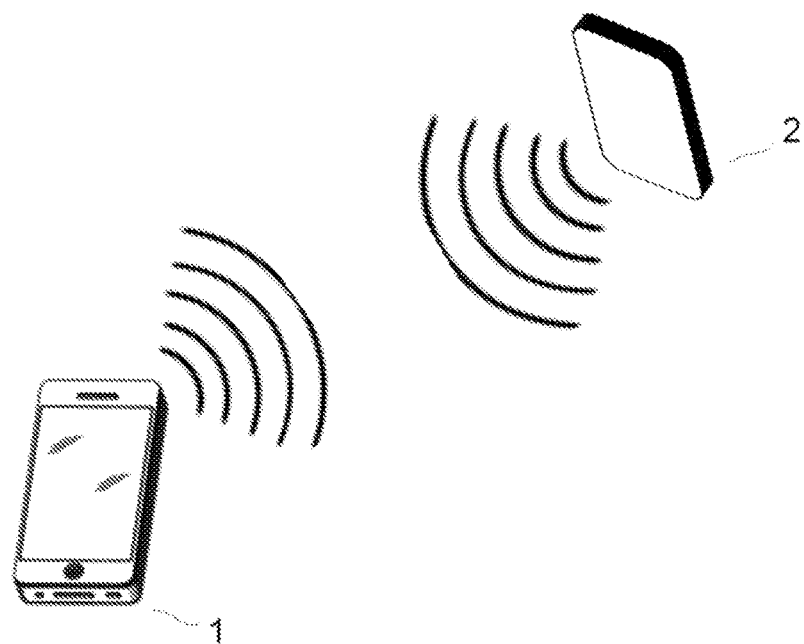
FIG. 1A schematically represents two devices (here smartphones) transmitting and receiving signals, as involved in embodiments of the invention.
Figure 1B:
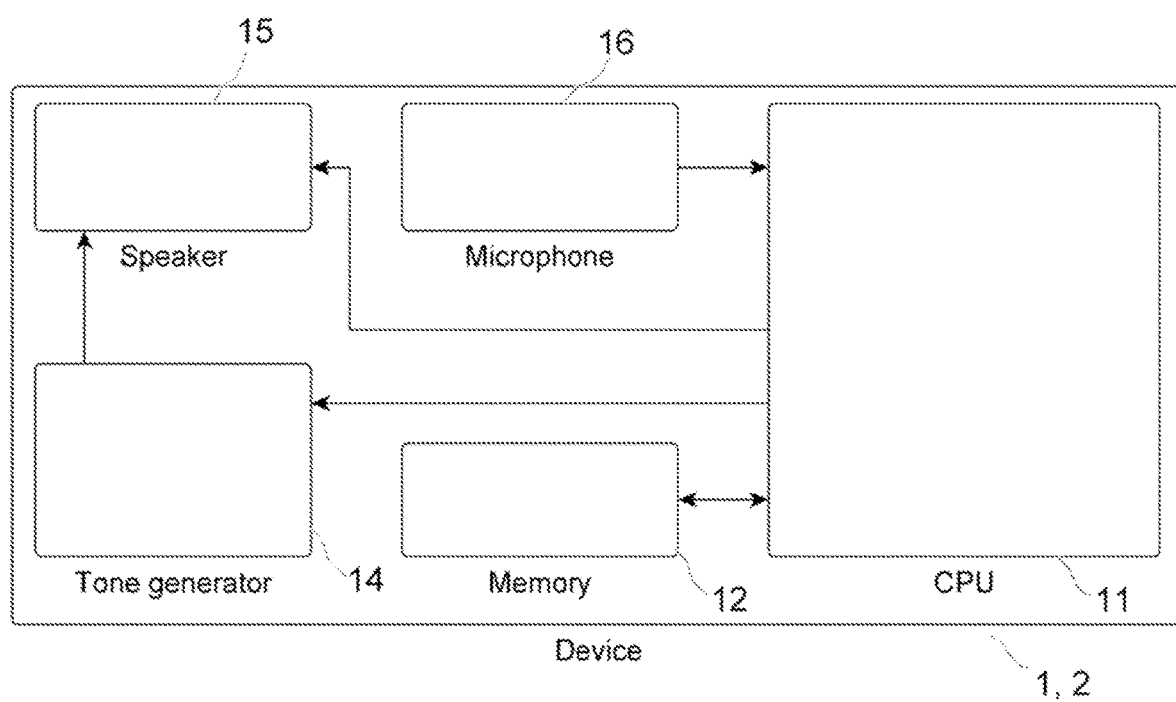
FIG. 1B is a diagram schematically illustrating selected components of such devices, as in embodiments.
Figure 2:
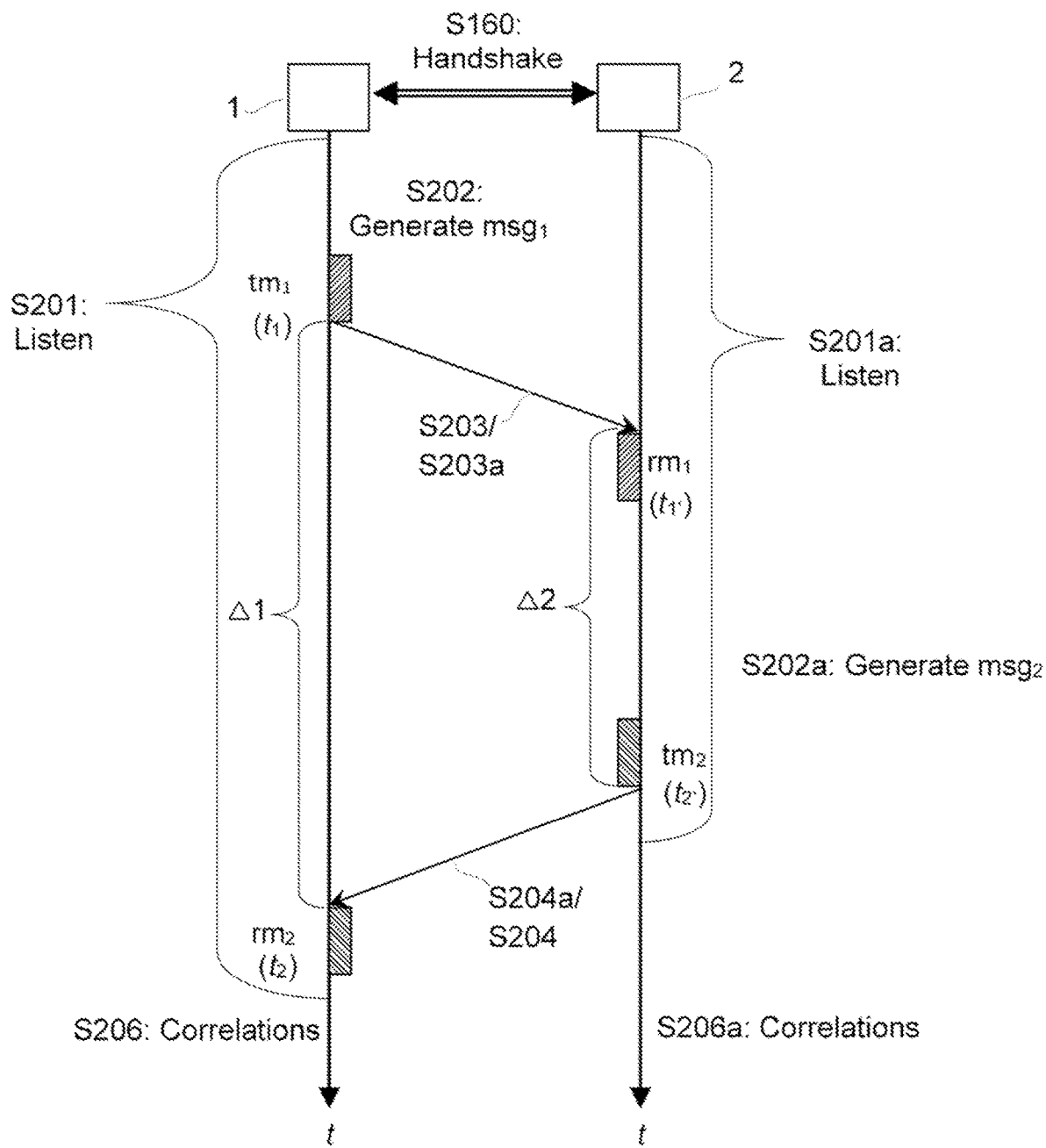
FIG. 2 illustrates a sequence of operations performed at two devices such as shown in FIG. 1A, as part of a double-sided two-way ranging protocol, according to embodiments.
Figure 3A:
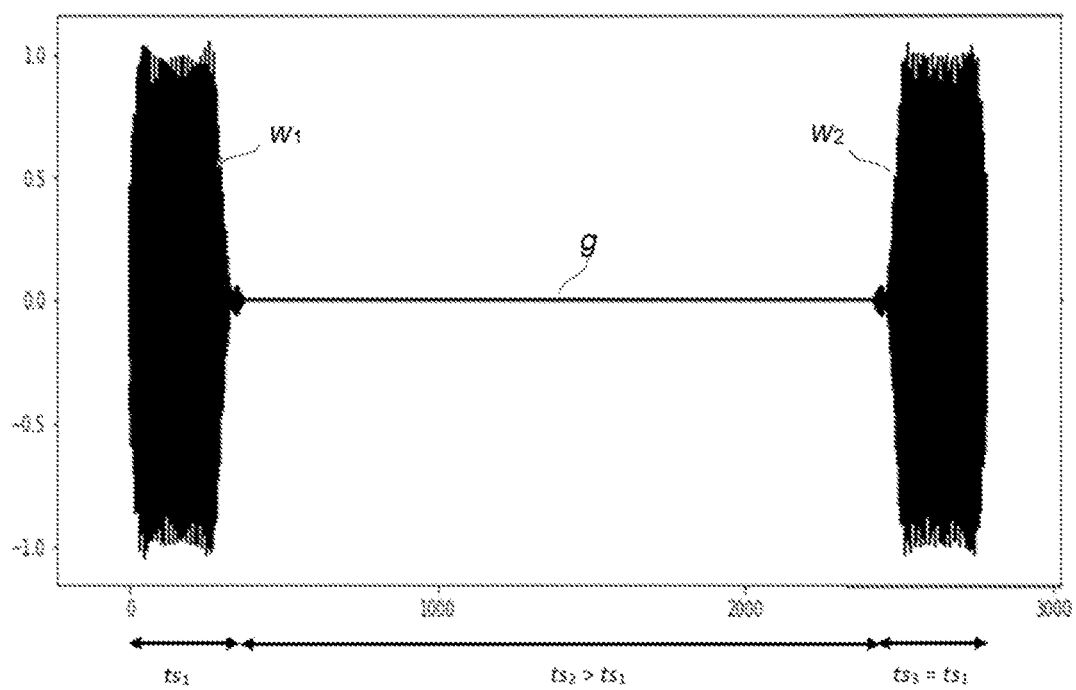
FIG. 3A is a plot representing a composite tone as generated at each device; this tone is generated as a composition of two waveforms that are separated by a gap, hence forming a bipolar waveform, according to embodiments.
Figure 3B:
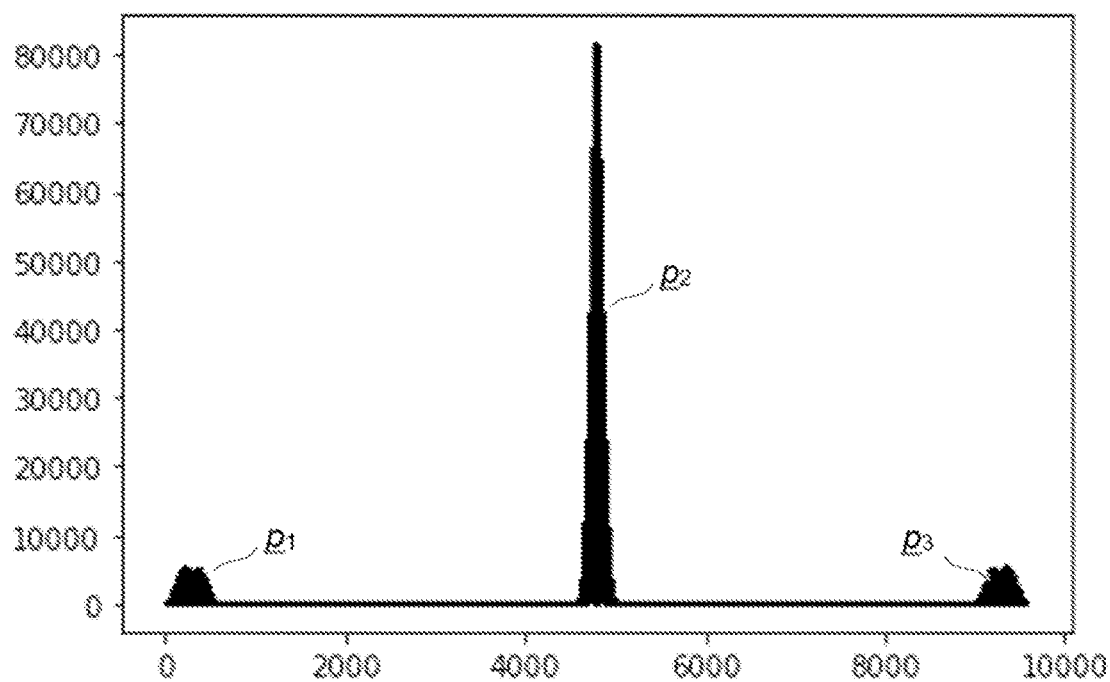
FIG. 3B is a plot representing a typical correlation measurement exhibiting a triple-peak pattern, as obtained by a device upon correlating signals, as in embodiments.
Figure 4:
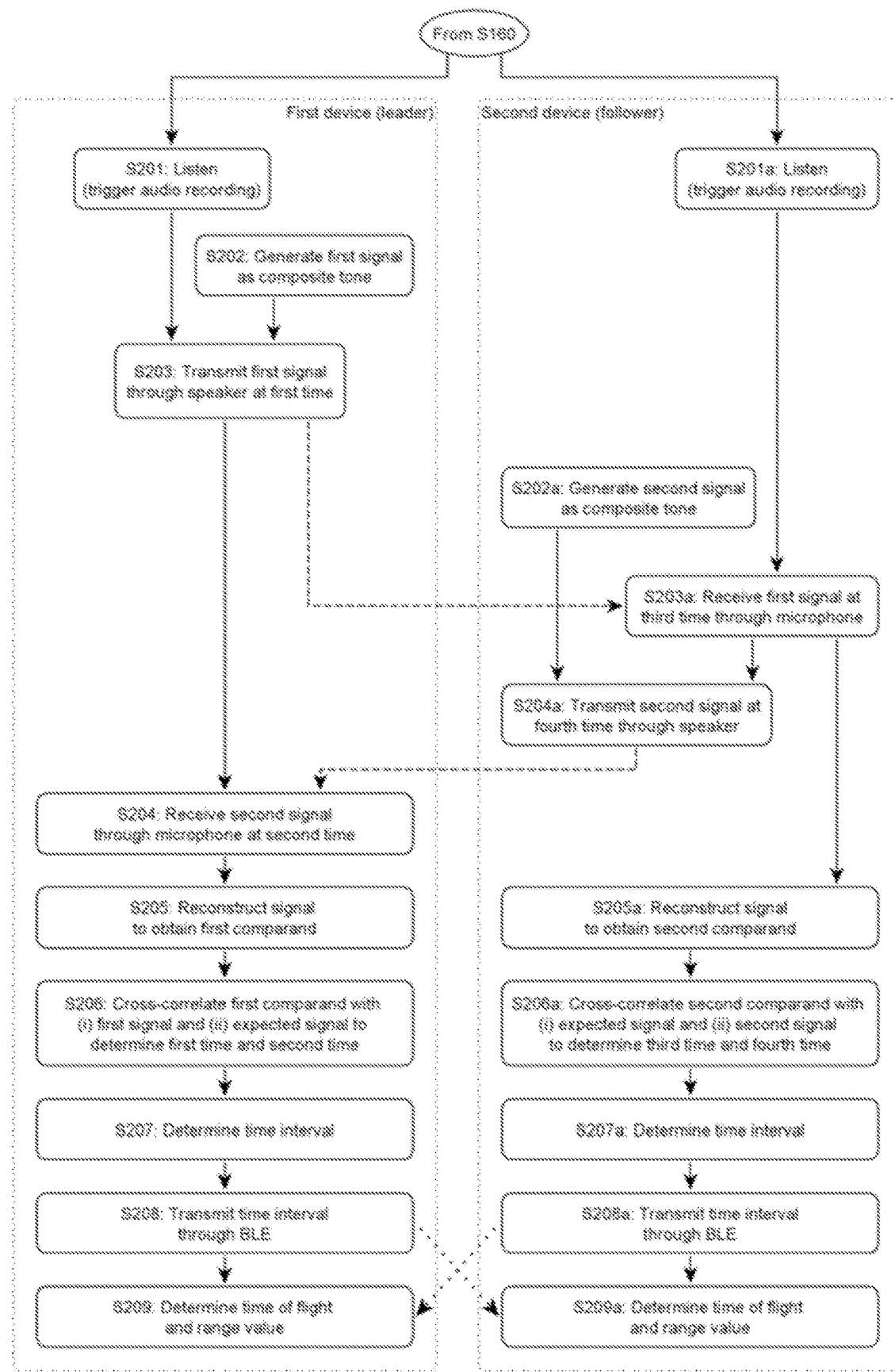
FIG. 4 is a flowchart illustrating steps of a method of performing a double-sided two-way ranging based on composite tones generated at the devices, according to embodiments.

In reference to FIGS. 1-4, an aspect of the invention is first described, which concerns a method of determining a range between two devices 1, 2. Note, this method and its variants are collectively referred to as the "present methods". All references Sn refer to methods steps of the sequence and flowcharts of FIGS. 2, 4, 5, and 6, while numeral references pertain to components of the devices 1, 2 shown in FIGS. 1 and 2. In the following description, the devices 1, 2 are mostly assumed to be handheld devices, such as smartphones, for the sake of illustration. The two-way ranging step is generally referred to as step S200 in the flows of FIGS. 5 and 6. FIG. 4 shows detailed steps of the two-way ranging method, as in preferred embodiments. FIG. 2 illustrates the most important operations performed for determining a range.

This method basically relies on performing a double-sided two-way ranging protocol S200 at two devices 1, 2. As usual in the art, this protocol causes the two devices to transmit and receive signals. However, in the present invention, each of these signals is a composite tone generated as a composition of two waveforms that are timewise separated by a gap, so as for the composition to form a bipolar waveform. This makes it possible to markedly improve the measurement accuracy, as explained later in detail.

Various embodiments of the above protocol can be contemplated, in which signals are exchanged between pairs of devices and then processed by the devices, to determine a range value. In a preferred embodiment, one of the two devices (say the first device 1) transmits a first signal to the second device 2 (step S203 in FIGS. 2 and 4), at a first time.

The first device 1 subsequently receives (step S204 in FIGS. 2 and 4) a second signal, i.e., a signal that is transmitted (step S204a) by the second device 2 after receiving S203 the first signal. Then, the first device 1 attempts to correlate signals (step S206) to determine the second time and, accordingly, a time interval between the first time and the second time, with a view to deriving S207-S209 the range between the two devices. This time interval is referred to as a first time interval in this document, for reasons that will become apparent later.

Importantly, each of the first signal and the second signal is a composite tone (i.e., a sound) that is generated (steps S202, S202a) at the first device 1 and the second device 2, respectively. Namely, this tone is generated as a composition of two waveforms $w_1$, $w_2$, which are separated (in time) by a gap g, as illustrated in FIG. 3A. Each waveform may for instance be an ultrasonic or a near-ultrasonic waveform, for reasons explained later. That is, each tone is generated as a temporal composition, i.e., as consecutive signal segments including a waveform $w_1$, a gap g, and another waveform $w_2$. The resulting tone is thus a time-dependent bipolar signal, i.e., a signal having a time-dependent bipolar wave structure.

The gap g ideally corresponds to a zero-amplitude signal, although it can also be noise at low to very low amplitude level. That is, the amplitude of the signal in the gap g is much lower than, if not negligible in comparison with, the amplitude of the signals corresponding to the two waveforms $w_1$, $w_2$. The signal-to-noise ratio (SNR) should typically be larger than 10, at least, though it preferably is larger than 20, or even larger, e.g. 30. The SNR may also be expressed in decibels as $SNR_{dB}=10\log_{10}(SNR)$. The $SNR_{dB}$ may for instance be chosen so as to ensure at least a 15 dB difference between the waveforms and the gap, corresponding to a SNR of approximately 31.6. For example, if the waveforms are, each, at −60 dB on average, then the noise level should typically be less than −75 dB, on average. Thus, the low or very low signal amplitude at the level of the gap g effectively results in a temporal gap between the two waveforms $w_1$, $w_2$ in the generated tone.

The preferred embodiment discussed above focuses on the first device 1, which performs steps S203-S209 in the flow of FIG. 4. However, mirror steps are typically implemented at the second device 2, whereby the second device receives S203a the first signal, transmits S204a the second signal, and attempts to perform S206a correlations with a view to determining a second time interval between the reception time and the transmission time, also referred as third time and fourth time in this document, respectively. Thanks to the first and second time intervals determined, the devices 1, 2 can derive S209, S209a the time of flight and, in turn, the range between the two devices. Because of the symmetry of the operations performed at the two devices, such an embodiment can be regarded as a symmetrical double-sided two-way ranging method.

Each device 1, 2 may possibly be able to precisely determine the time at which it transmits its own signal. In that case, it is sufficient for the devices 1, 2 to correlate an expected signal (i.e., the signal they expect to receive from the other device) with a comparand, which is obtained by recording the received signal, in order to precisely determine the reception time.

If it is not possible for the device to precisely determine the transmission time, then the comparand may further include a recording the transmitted signal (in addition to the recording of the received signal), hence the need to start recording S201, S201a early enough. In that case, the comparand includes a recording of both the transmitted signal and the received signal. This way, each device 1, 2 may further correlate a representation of its own transmitted signal with the comparand to precisely determine the time ($t_1$ or $t_{2'}$) at which it has transmitted the signal. Thus, two correlation operations are performed: one aims at determining the reception time, the other is to determine the transmission time. The comparands used by the two devices 1, 2 are referred to as the first comparand and second comparand, respectively. Eventually, the first device 1 determines a first time interval ($\Delta 1$ in FIG. 2) between the transmission time ($t_1$ or $t_{2'}$ in FIG. 2) and the reception time ($t_2$ or $t_{1'}$ in FIG. 2), while the second device 2 determines a second time interval ($\Delta 2$ in FIG. 2) between the reception time and the transmission time.

In the above embodiment, each device 1, 2 correlates S206, S206a a comparand formed according to its own recording with a representation of its own transmission signal to mark a corresponding transmission time in the recording, and further correlates S206, S206a the comparand with a representation of the counterpart's transmission signal to mark a corresponding receival time, as assumed in FIG. 4. Then, each device 1, 2 computes S207, S207a the time difference between these two times. They subsequently communicate S208, S208a the time differences accordingly obtained to one another, which allows them to determine S209, S209a the time of flight. The time of flight equals half of the absolute difference between the two time intervals accordingly obtained. I.e., the time of flight is simply calculated as $|\Delta 1 - \Delta 2|/2$, where $\Delta 1 = t_2 - t_1$ and $\Delta 2 = t_{2'} - t_{1'}$. The range between the two devices can then easily be derived from the time of flight, based on laws of physics. This last operation is normally a mere multiplication between the speed of sound in the air times the time of flight).

The present methods may notably be applied to social distancing measurements. E.g., the above steps may be performed at the two devices 1, 2, as soon as it is determined that they are likely in range. To that aim, a preliminary handshake may be performed S160; The handshake further makes it possible to determine which device will take the lead, as in embodiments described below.

Of particular advantage is the structure of the generated tones (i.e., waveform $w_1$-gap g-waveform $w_2$), which allows an adequate recognition of a corresponding peak in the cross-correlation measurement. As illustrated in FIG. 3B, this peak allows a clearer, more precise, and more accurate detection to be performed, in practice. Unlike other waveforms as typically used in prior methods to generate a single central peak, here the composite tone (FIG. 3A) generated and transmitted by each of the two devices 1, 2 yields a triple-peak pattern upon correlating the signals, as depicted in FIG. 3B. A triple-peak pattern means a large peak $p_2$ between two small peaks $p_1$, $p_3$, with gaps in-between, where the gaps have known time durations. The gaps between, on the one hand $p_1$ and $p_2$, and, on the other hand, $p_2$ and $p_3$ are symmetric and thus have a same duration. The latter is determined by the gap g, which is itself predetermined. This, as a result, helps with the detection of the peak appearance in the cross-correlation measurement obtained (in the time domain) for a more precise measurement of the time of flight, as a basis to proximity computation.

In other words, the present approach proposes to implement a two-way ranging method based on exchanges of specific, composite waveforms, which are transmitted and received as tones (i.e., sounds). This approach can advantageously be used to accurately detect (e.g., at a sub-millisecond accuracy) the point in time at which the signals are transmitted and received and, in turn, to estimate the range between the two devices more precisely.

As noted earlier, prior methods typically attempt to achieve this by looking for significant peaks in the cross-correlation signal. However, this typically leads to false peak detections due to noise and interferences. By contrast, the present approach makes it easier to detect the "right" peak in the cross-correlation footprint, which allows a more accurate measurement.

All this is now described in detail, in reference to particular embodiments of the invention. To start with, each of the two devices 1, 2 is preferably a handheld device, e.g., a wireless device such as a mobile phone (a smartphone), a smartwatch, a tablet, or a personal assistant. The devices 1, 2 may also be dedicated devices, e.g., forming part of or making up an employee tag (a pager) or a badge, especially where the present methods are performed to measure social contacts. In variants, however, the present methods may also be implemented in larger devices, such as cars or other vehicles, for example.

Each of the two devices 1, 2 may for instance include a speaker 15 and a microphone 16, to transmit and record the signals, respectively. In addition, each device 1, 2 may include processing means 11 (e.g., a central processing unit or CPU), a main memory 12 (connected to the processing means 11), a long-term memory (not shown), as well as various controllers, as necessary to operate the speaker and the microphone, as known per se. That is, the processing means 11 is suitably connected to the speaker 15 and the microphone 16 via a system bus, to allow the signals to be transmitted and received, as necessary to perform the present methods.

In particular, the first device 1 may transmit S203 the first signal through its speaker 15, for the second device 2 to detect S203a the first signal though its respective microphone 16. Next, the second signal is transmitted S204a through the speaker 15 of the second device 2 and received S204 at the first device 1 though the microphone 16 of the latter. Eventually, the first device 1 may attempt to correlate S206 its recording (forming a first comparand) with (i) a representation of the first signal and (ii) an expected signal, with a view to deriving a first time interval, thanks to its respective processing means 11. Similar steps can be performed at the second device 2, to derive a second time interval, as explained earlier.

As illustrated in FIG. 3A, each waveform $w_1$, $w_2$ extends over predetermined time segments $ts_1$, $ts_3$, respectively. Such time segments $ts_1$ and $ts_3$ preferably have a same duration, i.e., $ts_1 = ts_3$, as assumed in FIG. 3A. Moreover, the duration $ts_2$ of the gap g is preferably larger than $ts = ts_1 = ts_3$. Making such a gap g longer than the time duration ts of the waveforms $w_1$, $w_2$ results in a nicely decorrelated triple-peak pattern, where the central peak does not overlap with the side peaks, as illustrated in FIG. 3B. Each of the two waveforms $w_1$, $w_2$ may for instance extend over a predetermined time segment $ts = ts_1 = ts_3$, while the gap $ts_2$ may amount to a predetermined number a of such time segments ts. I.e., $ts_2 = a\, ts$, where $a > 1$. In addition, an additional gap (not shown) may precede the first waveform $w_1$. Similarly, a further gap (not shown) may succeed the second waveform $w_2$. For example, the gap signal generated at each device 1, 2, can be padded with any arbitrary zero-amplitude segments preceding and following each of the core waveforms $w_1$, $w_2$. In all cases, the cross-correlation of signals corresponding to the tones accordingly obtained generates a triple-peak pattern that can advantageously be used to precisely identify the timing of wave transmission and reception by both devices 1, 2.

Note, the correlation operation performed may possibly be performed as the cross-correlation of two continuous functions representing the compared signals. In practice, however, the algorithm preferably uses discrete time series, which can notably be computed as C(s, t)=corr(X(s), Y(t)) for two variables X(s) and Y(t) and for all time lags s and t. Thus, the correlation is performed based on two vectors (two arrays of values), yielding a further vector in output. The maxima of the correlation values obtained in output yield the relevant times, i.e., the times corresponding to the indexes that correspond to the maxima. This correlation is most practically performed as a convolution, i.e., as corr(X(s), Y(t))=convolve(X(s), reverse(Y(t)), where reverse(Y(t) corresponds to reversed values of Y(t), i.e., values that are reversed in terms of indexes (so, reversed time-wise too).

A possible implementation (in Python) is the following (the correlation function is defined as "xcorr2"):

```
a. static public double[ ] xcorr2(double[ ] a, double[ ] b, String type) {
b.   double[ ] revb = ArrayUtils.clone(b);
c.   ArrayUtils.reverse(revb);
d.   double[ ] c = new double[ ] { };
e.   switch (type.toLowerCase( )) {
f.   case ("full"):
g.     c = MathArrays.convolve(a, revb);
h.     break;
i.   case ("valid"):
j.     c = convolveValid(a, revb);
k.     break;
l.   case ("same"):
m.     c = Math Arrays.convolve(a, revb);
n.     break;
o.   }
p.   return c;
q. }
```

The convolution function ("MathArrays.convolve") may be similar to the function\Apache Commons Math 3.6 API.

In embodiments, each of the two waveforms $w_1$, $w_2$ (as used to generate S202, S202a the composite tone at each device 1, 2) has an inaudible sound frequency. This way, the resulting tone is inaudible for human beings. This is especially advantageous when the present methods are applied to social distancing; the devices 1, 2, are typically handheld devices in that case. In particular, this frequency may be an ultrasonic or near-ultrasonic frequency. Each of the two waveforms $w_1$, $w_2$ is thus a non-audible signal, typically formed at the low non-hearable frequency range (±18.5-20 kHz), which can be achieved with any conventional, contemporary phone speaker's hardware, but cannot be heard by most persons.

The two waveforms $w_1$, $w_2$ may notably be formed by randomizing two ultrasonic frequencies, respectively, based on a predetermined seed. That is, each device 1, 2 randomizes two ultrasonic frequencies based on some predetermined seed. The two frequencies may initially be the same. Then, each device creates two corresponding tones for some predetermined time duration and composes an entire waveform as a composition of the first waveform, a gap g of zero- or low-amplitude signal, and the second waveform.

Note, instead of microphones and speakers, the devices 1, 2 may rely on other types of transducers, especially when ultrasonic frequencies are used. In that case, the receiver instrumentation may include a gyroscope or some other type of transducer that is able to pick up ultrasonic tones.

In two-way ranging methods based on exchange of data packets, the relevant signal parameters can be included as part of the messages exchanged. Such an approach, however, is difficult to implement when the signals exchanged are audio signals. Still, such parameters can conveniently be communicated over a wireless communication channel established S150 between the two devices 1, 2, as assumed in FIG. 5.

Figure 5:
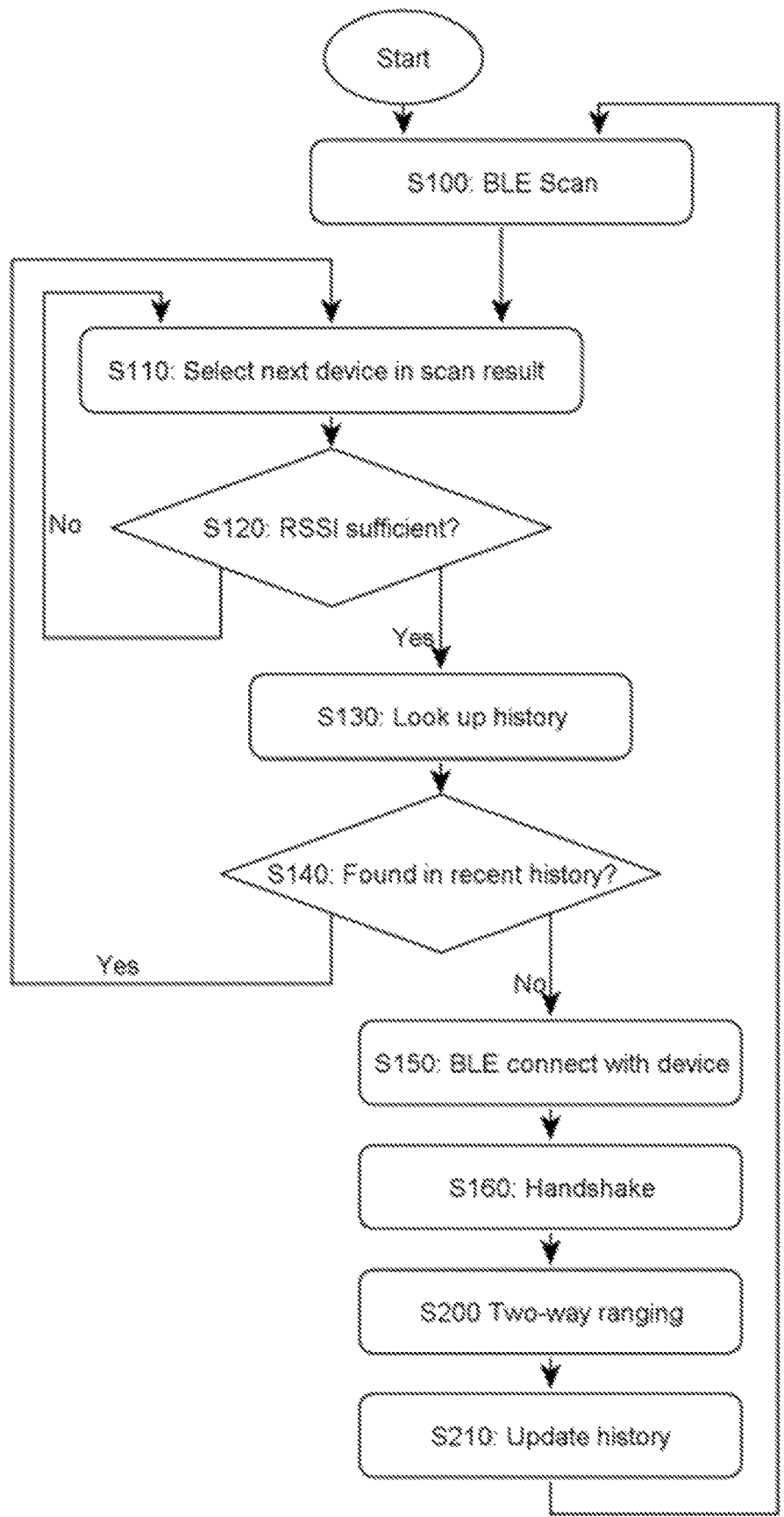
FIG. 5 is a flowchart illustrating high-level steps of a method of operating devices with a view to measuring social distancing between users of such devices. This further method scans devices in the vicinity of a given device to implement a two-way ranging method such as depicted in FIG. 2 or 4, as in embodiments.

In that respect, and as noted earlier, the present methods may further comprise performing S160 a preliminary handshake between the two devices 1, 2, over the wireless communication channel established at step S150, as seen in FIG. 5. This communication channel is preferably established S150 according to a wireless technology standard, such as Wi-Fi, Bluetooth, and Bluetooth Low Energy (BLE). The latter is assumed in the accompanying drawings.

This handshake will typically be automatically implemented S160 as part of the two-way ranging protocol, even though it is performed over a distinct channel. That is, the two-way signals are sounds that propagate as acoustic waves, while messages and data exchanged by the two devices 1, 2 are propagated as radio waves. As a result of this handshake, one of the two devices is appointed as a leader, while the other device is designated as a follower.

Assume that the first device 1 is designated as a leader, as in FIGS. 2 and 4. As such, the first device 1 may impose certain signal parameters and communicate S160 them to the second device 2 over the established communication channel, during the preliminary handshake. Such parameters may notably include the seed (as needed to randomize the ultrasonic frequencies), the durations of the waveforms and the gap g, and the time delay after which to send S204a the second signal. This time delay can for instance be of approximately 250 ms. It must be sufficiently larger than an expected single trip time. Note, this time delay may possibly be chosen at random by the first device 1 to mitigate the risk of collisions with signals received from other devices, it being noted that the device 1 may concomitantly interact with several remote devices. More precisely, this time delay may be the sum of a minimal, preset duration plus a random duration. For example, a first time delay of 50 ms may be applied, prior to sending the first message $tm_1$, a second time delay of 250 ms may be imposed prior to sending the response signal $tm_2$. The recording duration will typically be on the order of a second for each device 1, 2, to make sure that each recording captures both the transmitted signal and the response signal.

In the embodiment described just above, the leader 1 imposes the signal parameters and forwards them to the follower 2. In variants, parts or all of these parameters may be predetermined and fixed as part of requirements of the protocol. In other variants, the preliminary handshake S160 may cause the two devices 1, 2 to exchange their corresponding seeds, and the durations of the waveforms and the gap g, it being noted that this gap does not need to be the same for the transmitted signal and the received signal.

Referring back to FIG. 2: the first device 1 is assumed to be designated as a leader and accordingly transmits S203 the first signal to the second device 2 upon completing S160 the handshake. Concurrently, each device 1, 2 starts listening S201, S201a (i.e., recording) right after completing the handshake. This way, the recording performed by each device 1, 2 includes a fingerprint of both the transmitted signal and the received signal, which allows the devices to precisely determine the relevant times and the time intervals. Note, the transmission S203 of the first signal may possibly start right after completing the handshake. In variants, the transmission S203 of the first signal is preceded by a timeout phase, to allow sufficient time for the first device 1 to generate S202 the first signal, if necessary.

As seen in FIG. 2, the first device 1 generates S202 a first signal ("Write(msg$_1$)"), such that an audio signal tm$_1$ is generated, which is then transmitted S203 by the first device 1 as a sound wave, at a time t$_1$ (also referred to as a "first time" in this document). This signal is received S203a by the second device 2 at a time t$_{1'}$ (also referred to as a "third time" in this document). More precisely, the second device 2 records the signal tm$_1$ via its microphone to obtains an audio signal rm$_1$. Once the time delay (as previously set and communicated by the first device 1) has elapsed, the second device 2 transmits S204a the second signal at a time t$_{2'}$ (also referred to as a fourth time in this document). This signal is timely generated at step S202a ("Write(msg$_2$)"). The audio signal tm$_2$ is then received S204 by the first device 1 at a time t$_2$ (also referred to as a "second time" in this document). That is, the first device 1 records the audio signal tm$_2$ via its microphone and accordingly obtain an audio signal rm$_2$.

Thus, both devices record audio throughout the entire process. To that aim, each device 1, 2 timely triggers S201, S201 a audio recording via its respective microphone 16, to be able to receive the signal transmitted by the other device 2, 1. The embodiments depicted in FIGS. 2 and 4 assume that each device 1, 2 starts recording right after completing the handshake S160. Such recordings are typically triggered for a limited time duration, e.g., an upper bound to an expected transmission cycle. In variants, the devices 1, 2 may attempts to record the counterpart signal only, assuming they are able to precisely know at which time they have transmitted their own signals.

The process shown in FIG. 2 may notably be implemented as follows. First, a handshake is performed S160. Then, the first device 1 starts S201 recording upon completing the handshake and transmits S203 its signal after 50 ms. The second device 2 similarly starts S201a recording upon completing the handshake but transmits S204a its signal only after 250 ms, in accordance with parameters transmitted by the first device 1 during the handshake. The recording of the first device 1 includes its own transmission, followed by the signal sent by the second device 2. Similarly, the recording of the second device 2 includes the transmission from device 1 followed by the transmission of device 2.

As said, each device 1, 2 may reconstruct a signal from its respective audio recording, in order to subsequently cross-correlate the reconstructed signal with representations of the expected counterpart signal and its own transmission. To that aim, it may use the seeds and time durations as set during the handshake. Note, the signal reconstruction may involve trimming, filtering (for noise), and/or amplifying the audio sample obtained. E.g., the audio samples may first be trimmed (using a suitable heuristic to identify the expected patterns), then de-noised, amplified, and, if necessary, clipped, levelled, etc., using any suitable audio signal processing method known in the art. The reconstructed signals provide comparands, also referred to as first comparand (for the first device 1) and second comparand (for the second device 2) in this document. Eventually, each device 1, 2 cross-correlates S206, S206a its reconstructed signal (the comparand) with a representation of each of (i) its own transmission and an expected signal (the signal it expects to receive as per the handshake). Each cross-correlation yields a triple-peak pattern, such as shown in FIG. 3B. The central peak can be precisely located in time (with negligible error). This makes it possible to determine the relevant times (on each side) and then the corresponding time intervals (on each side). The corresponding time of flight can thus be derived, in order to determine the range between the two devices.

This, in turn, makes it possible to determine the appearance time in the triple-peak pattern obtained from the correlation. The detection in time of the triple-peak pattern is then used to determine S207, S207a the time interval, i.e., the delta time lag between the transmission time and the reception time, denoted by Δ1 and Δ2 in FIG. 2. The time lag computed by each party 1, 2 can then be communicated S208, S208a to the other party over the wrapping communication channel. This way, each device 1, 2 is able to compute the distance. In variant, one of the devices 1, 2 may send the time lag it has computed to the other party, for it to compute the distance and then send back the computed distance, for the counterpart device to derive a time lag, and then, a distance.

FIG. 4 shows a preferred flow of operations, which is now described in detail. After the handshake S160 (FIG. 5), whereby the first device 1 has been designated as a leader, the first device 1 starts S201 recording (possibly after a timeout phase) and generates S202 a first signal as a composite tone, as explained earlier. At step S203, it transmits the first signal through its speaker. This signal is recorded by the second device 2. The first device 1 then receives a response signal at step S204, i.e., it records a corresponding waveform through its microphone. A signal is reconstructed from this audio recording at step S205; the reconstructed signal provides a first comparand. The device 1 finally correlates S206 this comparand with representations of each of the transmitted signal and the expected receival. A time interval is accordingly determined at step S207 and transmitted S208 to the second device 2 over the communication channel previously opened, e.g., through BLE. Similarly, the first device 1 receives a time interval as determined by the second device 2, which is used to determine S209 the range value.

A concurrent flow is implemented at the second device, which was designated as a follower during the handshake S160. Upon completing the handshake, the second device 2 starts S201a listening, i.e., it triggers audio recording. It receives S203a the first signal through its microphone and records it. At this point, the device 2 may already have generated S202a a second signal (again as a composite tone), which it transmits at step S204a through its speaker. This signal is recorded by the second device 2. A suitable signal is then reconstructed S205a from the audio recording, to obtain a second comparand. The latter is eventually correlated S206a by the second device 2 with each of the received signal and the transmitted signal, to determine S207a a time interval. The latter is passed to the first device at step S208a, while the time lag calculated by the first device 1 is passed to the second device 2 for it to compute S209a the range value.

Figure 6:
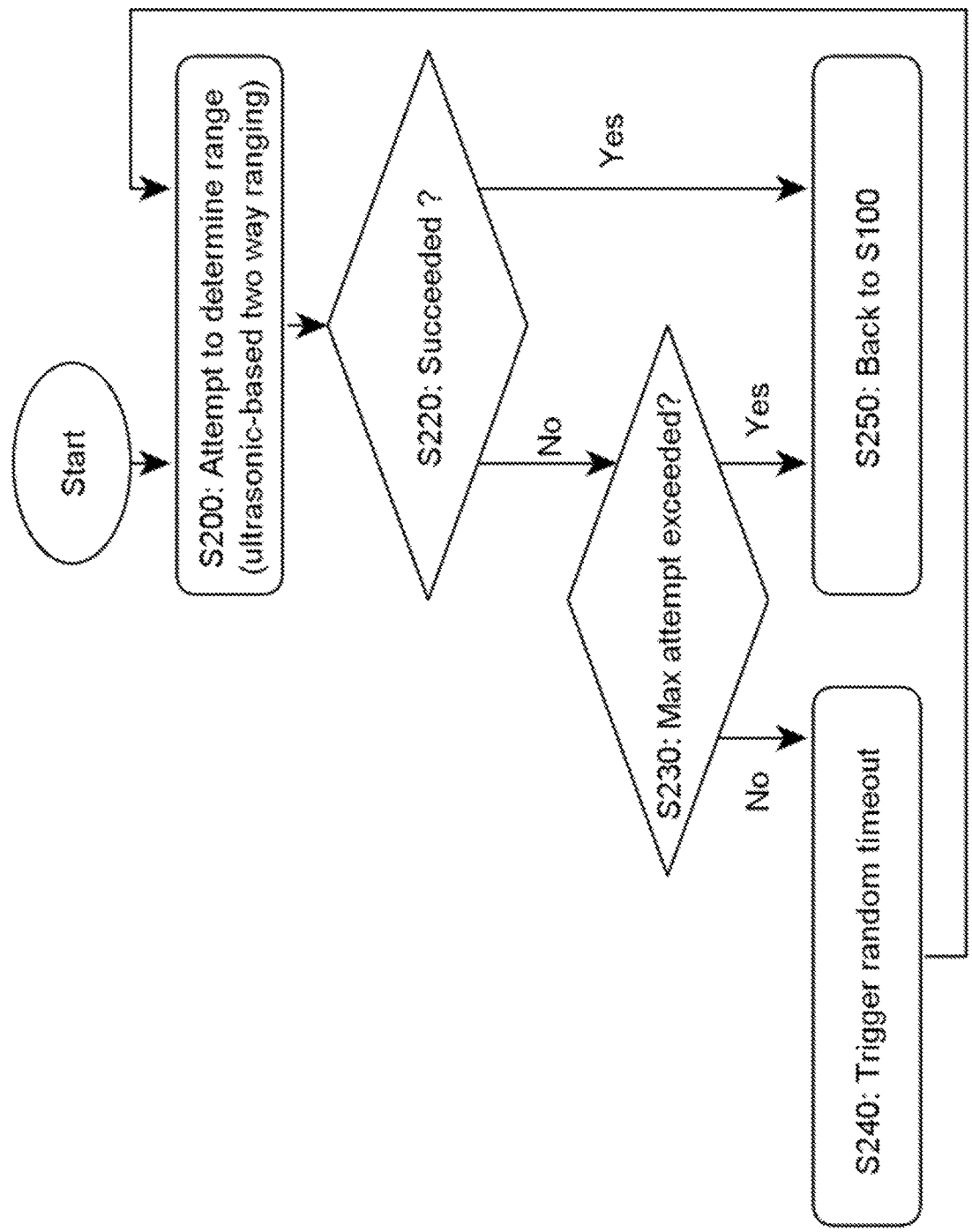
FIG. 6 is a flowchart illustrating how it can repeatedly be attempted to determine a range between any two devices, using a method such as shown in FIG. 2 or 4, to successfully determine a range between devices, according to embodiments.

Several cycles may be needed in order to successfully derive a range value, e.g., to overcome potential conflicts with other pairs residing within the same space, or improve this value, as now discussed in reference to FIG. 6. That is, the two-way ranging protocol may comprise one or more additional cycles of operations S200. During each additional cycle, the first device 1 (leader) again transmits S203 a test signal (normally the same signal as previously transmitted) to the second device 2, receives S204 a response signal (normally the same as previously transmitted by the second device 2), and correlates S206 signals as explained above to determine S207-S209 the range between the two devices 1, 2. Again, mirror steps can be performed at the second device 2.

As further seen in FIG. 6, each further cycle is preferably triggered (S220: No, S230: No) after a timeout has elapsed, see step S240. This timeout is preferably chosen S240 at random by the first device 1. More precisely, the timeout may include a preset part and a random part. This timeout is then communicated to the second device 2 over the communication channel, e.g., as previously established S150 to enable the preliminary handshake S160 or re-established so of necessity. That is, the two devices 1, 2 may agree to use random timeout durations prior to re-attempting to determining the range, to prevent potential collisions with signals sent from other devices, if necessary, given that each device 1, 2, may concomitantly interact with several remote devices. Such cycles may be repeated as necessary to successfully determine range values. Once it is determined that the range has been successfully determined (step S220: Yes), the algorithm may go back to a default mode, where, e.g., a device searches for the presence of other devices (i.e., back to step S100 in FIG. 5). Preferably, the protocol provides a maximum number of attempts (step S230). If this number is exceeded (S230: Yes), the cycles are interrupted and the device goes back to a default mode (e.g., back to step S100 in FIG. 5).

Performing several detection cycles as described above may be useful to arrive at sensible range values. In addition, this can be used to improve resilience and suitability in situations where more than two devices come to interact. Note, in that respect, that the present methods may include a self-verification mechanism at step S220, using any suitable heuristic. For instance, each device 1, 2 may check the computed time intervals against expected values. The devices may, at least, verify whether positive time lags were obtained, it being noted that audio communication interferences may result in improper detections and, in turn, in incorrect time lags.

As evoked earlier, the present methods may advantageously be performed to measure social distancing (i.e., social contacts), whereby range values are determined S207-S209 (S207a-S209a) by each device 1, 2 with a view to building and updating S210 a history of contacts. To that aim, each device 1, 2 may continually contact S150 other devices that are determined S100-S120 to be in a sufficiently close range, as now discussed in detail in reference to FIG. 5.

Basically, social distancing measurements may be achieved by continually performing S200 a double-sided two-way ranging method, i.e., for each pair of devices that are expected (S120: Yes) to be in sufficiently close range. The range values accordingly determined S200 are then recorded S210 in a history of each device 1, 2. This history can then be used to issue warnings, messages, etc., to the device users and/or authorities. Note, such methods described herein are assumed to be performed with the consent of the users and in accordance with the applicable regulations.

A preferred flow is the following. This flow is assumed to be performed at the first device 1, it being noted that similar flows may be performed at any device that is compatible with this protocol. First, the device 1 searches S100 for the presence of surrounding devices, using, e.g., a suitable BLE scanning protocol. Several remote devices may accordingly be discovered. At step S110, the device 1 selects a next device as listed in the scan result. The device 1 may first look up S130 its own history, to check whether the currently selected (remote) device is found S140 in its recent history. If so (S140: Yes), there is no need to proceed further and the device 1 selects a next device in the scan list. If not (S140: No), the device 1 sets up S150 a communication channel with the currently selected device (e.g., a BLE channel), in order to perform S160 a handshake as described earlier. A two-way ranging is subsequently performed S200 and the range value determined is stored in the history of the device 1.

As further depicted in FIG. 5, the device 1 may first check whether the received signal strength indicator (RSSI) is indicative of a proximity that potentially requires testing, prior to starting interacting with the currently selected device. If the power of the radio signal is indicative of sufficient proximity (S120: Yes), then the device 1 proceeds further (steps S130, S140, etc.). If not (S120: No), it selects another device in the scan list.

The above embodiments have been succinctly described in reference to the accompanying drawings and may accommodate a number of variants. Several combinations of the above features may be contemplated. For example, in particularly preferred embodiments, each device 1, 2 is a smartphone that includes a speaker 15 and an audio microphone 16. In addition, each device is configured to generate a unique composite tone (as described earlier) to measure a time of flight to another, similarly configured device. That is, two core waveforms are combined to form a unique tone including a first frequency segment, a second segment of zero-amplitude (or noise at a very low level), and a third frequency segment, wherein both the first and third frequencies are generated using some predetermined seeds. Such frequencies are ultrasonic or near-ultrasonic, making the transmissions inaudible to human beings. The three aforementioned segments have predetermined time durations, where the gap has the longest time duration, as explained earlier.

Referring more specifically to FIGS. 1A and 1B, another aspect of the invention is now described, which concerns a device 1, 2. Aspects of this device have already been described in reference to the present methods. They are only succinctly discussed in the following.

Each device 1, 2, comprises processing means 11, e.g., a CPU. Various components are connected to the CPU, e.g., via a system bus and controllers (not shown). In particular, the device 1, 2, comprises a tone generator 14, a transmitter 15 (e.g., a speaker), and a receiver 16 (e.g., an audio microphone). In addition, a memory 12 is typically connected to the CPU, as usual in the art. All such components are known per se but need be properly configured, programmed, etc., to be able to perform the present methods. The memory 12 may comprise computerized methods, stored in the form of program code instructions (software), which, when loaded to the main memory and executed, cause the CPU to orchestrate operations of the tone generator 14, the transmitter 15, and the receiver 16, to allow the device 1, 2 to perform S200 a double-sided two-way ranging protocol with a remote device 2, 1, as described earlier in reference to the present methods.

In particular, the tone generator 14 may be configured to form the two waveforms $w_2$ as ultrasonic frequency tones by randomizing two ultrasonic frequencies, respectively, based on a predetermined seed. This generator 14 may further be designed to compose the two waveforms $w_1$, $w_2$ with a zero-amplitude (or noise-level) gap g to generate a composite tone. As explained earlier, each bipolar waveform $w_1$, $w_2$ preferably extends over a time segment that is smaller than the duration of the gap g. This way, the device 1 is able to transmit and receive signals (and reconstruct suitable signals), to determine a range between this device and a remote device.

A final aspect concerns a computer program product for determining a range between two devices. This computer program product comprises a computer readable storage medium having program instructions embodied therewith. Such instructions may for example be stored in a long-term memory of a device 1, 2 as described above, with a view to performing methods as described herein. That is, such program instructions are executable by processing means 11 of a device 1, 2 to cause the latter to perform a double-sided two-way ranging protocol as described earlier in reference to FIGS. 2, and 4 to 6.

As one understands, the present invention may be a method, a device, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of determining a range between two devices, the method comprising:
    performing a double-sided two-way ranging protocol, the latter causing the two devices to transmit and receive signals, wherein each of the signals is a composite tone generated as a composition of two waveforms that are timewise separated by a gap, so as for the composition to form a bipolar waveform.

2. The method according to claim 1, wherein:
    the two devices include a first device and a second device;
    the signals transmitted and received comprise a first signal and a second signal; and
    performing the double-sided two-way ranging protocol causes the first device to perform a set of steps comprising:
        at a first time, transmitting the first signal to the second device;
        at a second time, receiving the second signal that has been transmitted by the second device upon receiving the first signal, and
        correlating an expected signal with a first comparand, the latter obtained based on the second signal received, to determine a first time interval between the first time and the second time and accordingly derive the range between the two devices.

3. The method according to claim 2, wherein at the first device said set of steps further comprising:
    triggering audio recording, prior to transmitting the first signal, wherein the first comparand is obtained by recording both the first signal transmitted and the second signal received; and
    correlating a representation of the first signal with the first comparand to determine the first time, wherein the expected signal is correlated with the first comparand to determine the second time, wherein the first device determines the first time interval as a difference between the second time determined and the first time determined.

4. The method according to claim 3, wherein the representation of the first signal and the expected signal are correlated with the first comparand to obtain respective cross-correlation signals, each having a triple-peak pattern showing two smaller peaks separated by a larger peak.

5. The method according to claim 3, wherein performing the double-sided two-way ranging protocol further causes the second device to:
    triggering audio recording, prior to receiving the first signal transmitted by the first device, to obtain a second comparand by recording both the first signal received and the second signal transmitted by the second device;
    correlating both an expected signal and a representation of the second signal with the second comparand to determine times at which the first signal was received and the second signal was transmitted by the second device, respectively, and accordingly determine a second time interval as a difference between the determined times; and
    transmitting the second time interval to the first device.

6. The method according to claim 5, wherein the first device performs said set of steps further comprising:
    receiving the second time interval; and
    subtracting the second time interval to the first time interval to derive a time of flight of the first signal and the second signal and accordingly determine the range between the two devices.

7. The method according to claim 2, wherein as part of said protocol the method further comprising:
    performing a preliminary handshake between the two devices over a wireless communication channel established between the two devices, wherein the first device is appointed as a leader and accordingly transmits the first signal to the second device upon completing the handshake.

8. The method according to claim 7, wherein performing the two-way ranging protocol comprises performing one or more additional cycles of operations, each of the additional cycles comprising performing said set of steps, wherein
    each of the cycles is triggered after a timeout has elapsed, this timeout being chosen at random by the first device and communicated to the second device over the established communication channel during the preliminary handshake.

9. The method according to claim 7, wherein the first device performs the method further comprising:
    determining one or more parameters of a set consisting of the seed, a duration of the time segment, a duration of the gap, and a time delay after which to send the second signal, and
    communicating the one or more parameters determined to the second device over the established communication channel during the preliminary handshake.

10. The method according to claim 9, wherein the method further comprising:
    determining, by the first device, said time delay at random.

11. The method according to claim 7, wherein the communication channel is established according to a wireless technology standard that is one of Bluetooth, Bluetooth Low Energy, and Wi-Fi.

12. The method according to claim 2, wherein
    each of the two devices is a handheld device; and each of the two waveforms has an inaudible sound frequency, so as for the resulting tone to be inaudible for a human being.

13. The method according to claim 12, wherein each of the two devices includes a speaker, a microphone, and processing means connected to the speaker and the microphone, wherein the first device:
transmits the first signal through its respective speaker, for the second device to detect the first signal though its respective microphone;
receives the second signal though its respective microphone, the second signal transmitted through the speaker of the second device; and
correlates the expected signal with the first comparand, determines the first time interval, and derives the range between the two devices thanks to its respective processing means.

14. The method according to claim 2, wherein the method further comprises, at the second device, transmitting the second signal only after a predetermined time delay has elapsed.

15. The method according to claim 1, wherein each of the two waveforms extends over a predetermined time segment and a duration of the gap is larger than the predetermined time segment.

16. The method according to claim 15, wherein the two waveforms are formed as ultrasonic frequency tones by randomizing two ultrasonic frequencies, respectively, based on a predetermined seed.

17. A method of measuring social distancing according to claim 1, wherein the method comprises, at the first device,
continually contacting any second device determined to be in a sufficiently close range; and
for each second device contacted, performing said double-sided two-way ranging protocol.

18. A device comprising
processing means, and,
connected to the processing means:
a tone generator;
a transmitter; and
a receiver;
wherein,
the processing means are configured to orchestrate operations of the tone generator, the transmitter, and the receiver, for the device to be able to perform a double-sided two-way ranging protocol with a remote device, wherein, in operation:
the tone generator generates a first signal,
the transmitter transmits, at a first time, the first signal to the remote device;
the receiver receives a second signal at a second time from the second device, and
the processing means
obtains a first comparand based on the second signal received, and
correlates an expected signal with the first comparand to determine a time interval between the first time and the second time and accordingly determine the range between the two devices,
and wherein,
each of the first signal and the second signal is a composite tone generated as a composition of two waveforms that are timewise separated by a gap for the composition to form a bipolar waveform.

19. The device according to claim 18, wherein the tone generator is configured to:
form the two waveforms as ultrasonic frequency tones by randomizing two ultrasonic frequencies, respectively, based on a predetermined seed; and
compose the two waveforms and the gap so as for each of the two waveforms to extend over a predetermined time segment that is smaller than a duration of the gap.

20. A computer program product for determining a range between two devices, the computer program product comprising a computer readable storage medium having program instructions embodied therewith, the program instructions executable by processing means of each of the two devices to cause the latter to
perform a double-sided two-way ranging protocol causing the two devices to transmit and receive signals, wherein each of the signals is a composite tone generated as a composition of two waveforms that are timewise separated by a gap for the composition to form a bipolar waveform.

* * * * *